United States Patent [19]

Maier

[11] 4,009,982
[45] Mar. 1, 1977

[54] MECHANISM FOR FORMING AN ENLARGED COUPLING ON THE ENDS OF PLASTIC PIPE

[75] Inventor: Johann H. Maier, Miami Beach, Fla.

[73] Assignee: Universal Plastic Pipe Bending Corporation, Miami, Fla.

[22] Filed: Feb. 11, 1974

[21] Appl. No.: 441,161

[52] U.S. Cl. .............................. 425/389; 425/392; 425/393; 425/397

[51] Int. Cl.² ....................................... B29C 17/02

[58] Field of Search .......... 425/DIG. 208, 389, 390, 425/392, 393, DIG. 218, DIG. 418, 155, 163, 384, 395, 397; 249/65

[56] References Cited

UNITED STATES PATENTS

| | | | |
|---|---|---|---|
| 3,290,728 | 10/1960 | Pratt | 425/393 |
| 3,305,158 | 10/1963 | Whiteford | 425/389 |
| 3,360,826 | 1/1968 | Lorang | 425/392 |
| 3,425,093 | 2/1969 | Ansette | 425/389 |
| 3,753,635 | 8/1973 | Barnett | 425/392 |
| 3,843,302 | 10/1974 | Petzetakis | 425/393 |
| 3,890,079 | 6/1975 | Slater | 425/155 |

FOREIGN PATENTS OR APPLICATIONS 891,588  1/1972  Canada

Primary Examiner—Robert L. Spicer, Jr.
Attorney, Agent, or Firm—Lerner, David, Littenberg & Samuel

[57] ABSTRACT

An attachment for a plastic pipe bending machine for automatically and precisely enlarging the end portions of formed plastic pipe for interconnection with other like plastic pipe of same outside diameter.

7 Claims, 12 Drawing Figures

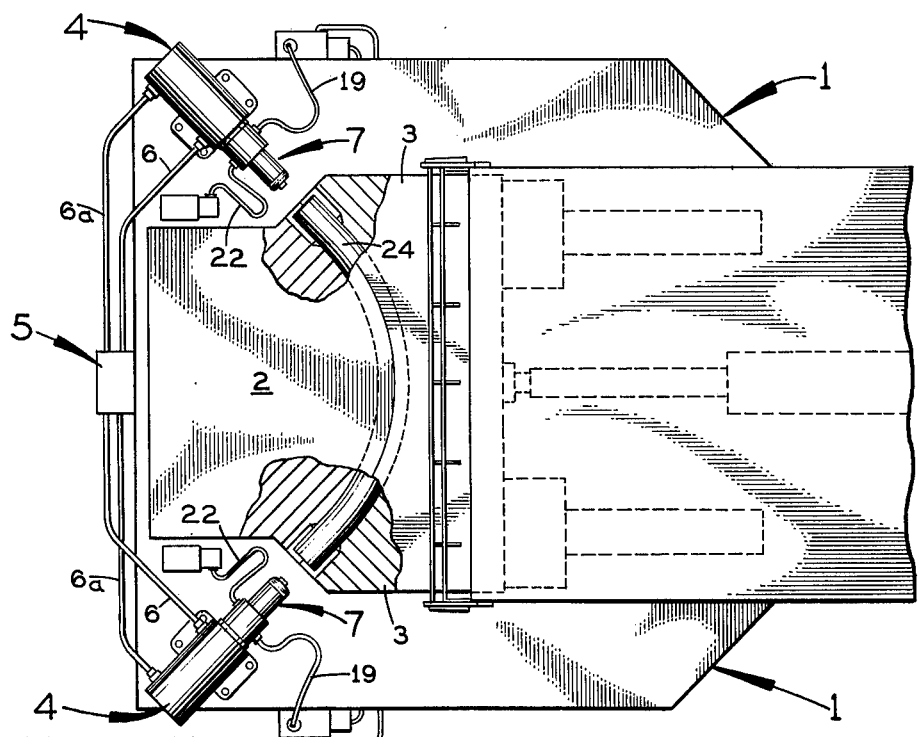
FIG. 1
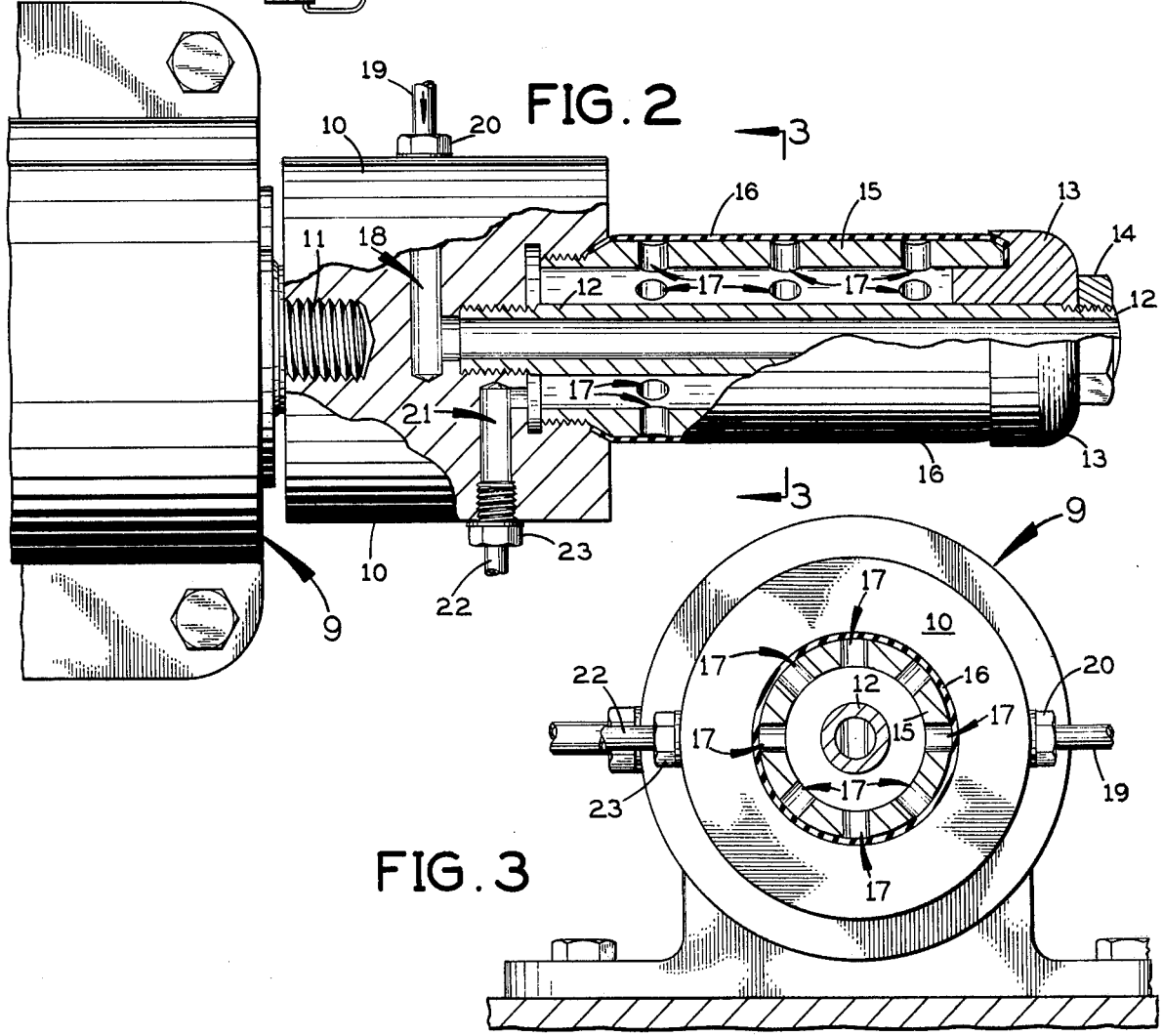
FIG. 2
FIG. 3

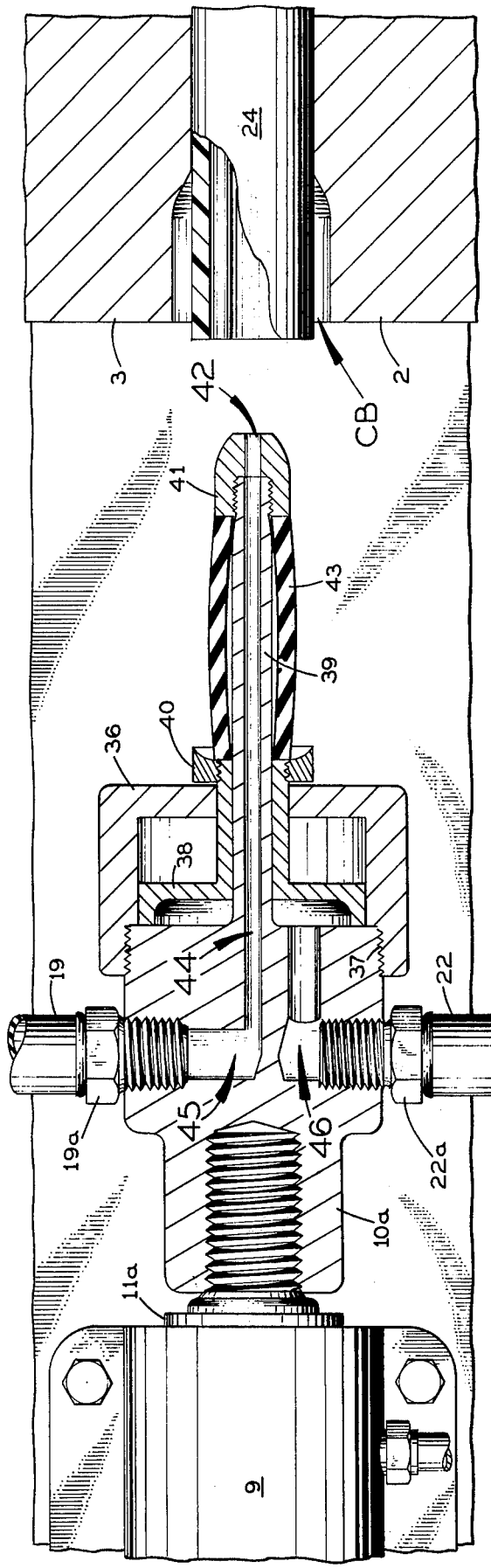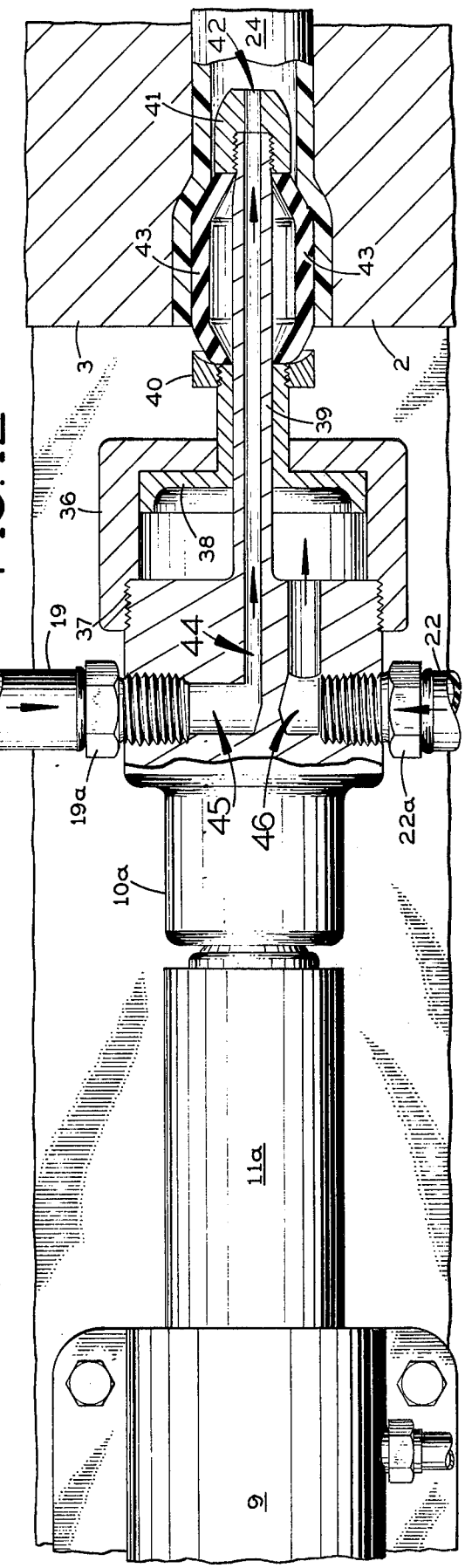

MECHANISM FOR FORMING AN ENLARGED COUPLING ON THE ENDS OF PLASTIC PIPE

This invention relates in general to an attachment mechanism for a plastic pipe elbow forming machine for enlarging the end portions of the formed elbow to accurately engage plastic pipe of like outside diameter.

Prior machines automatically heated pipe to a plastic state and projected an enlarged cylindrical core into opposite ends of the pipe for expanding the latter and then upon cooling the plastic, the cores were withdrawn. This process is not entirely satisfactory because of several variables including different thicknesses of the plastic pipe and irregularities in the expanded portion due to variations in temperature distribution and non-uniform ductibility.

The present invention overcomes the above objections and disadvantages by the provision of a mechanism for the insertion in opposite end portions of an elbow or other straight length of plastic pipe whereby an enlargeable insertable cylinder is provided with an elastomer outer sheath which is adapted to automatic expansion by air pressure to expand the pre-heated end portion of the plastic pipe into tight conformity with a cylindrical bore in a die means and subsequently applying compressed water to the cylinder for chilling the forming cylinder and the enlarged end portion of the pipe.

A further object of the invention is the provision of a hydraulically operated cylinder for insertion and removal of an expandable cylinder into and out of a pipe for forming an integral coupling on the end portion of the pipe, including a valve and connections for applying both air and water to the forming cylinder.

These and other objects and advantages in one embodiment of the invention are described and shown in the following specification and drawings, in which:

FIG. 1 shows a fragmentary plan view of the coupling forming device secured to an elbow forming machine in reduced scale.

FIG. 2 is a full scale fragmentary view of the cylinder for enlarging the end portion of a preheated plastic pipe.

FIG. 3 is a cross sectional end elevation of the device, taken through section line 3—3, FIG. 2.

FIG. 11 is a full scale plan view of an alternate construction for expanding the pipe.

FIG. 12 is the same as FIG. 11 in the operated position.

Figure 4:
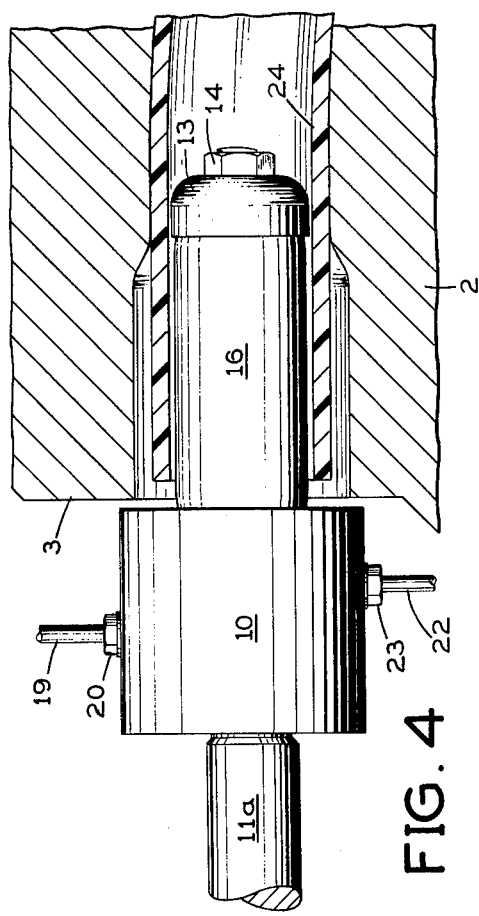
FIG. 4 illustrates the forming cylinder inserted in the heated end portion of a tube positioned in a counter bore of a die.

FIG. 1 illustrates the invention applied to a typical plastic pipe bending machine 1 which includes a fixed die member 2 and a driven die member 3. The broken away portions of the die show the cylindrical enlargement cavity at both ends thereof for forming the outside diameter of an integral coupling to be formed in the ends of the elbow while the pipe material has been heated to a predetermined degree of plasticity.

The main machine includes means for heating and sequentially delivering pluralities of like pipes for bending when the die is in open position, not shown.

The principal feature of the invention is the provision of a pair of hydraulically operated forming devices 4—4 which are adapted to simultaneously insert the forming end thereof within the end portions of the pipe while the latter is retained in the die members 2 and 3. The forming devices 4 are connected to a common hydraulic distributor means 5 by conventional tubing 6 and each forming device 4 has an expandable core 7 which is alternately fed air and water through flexible tubing 8—8 by means to be hereinafter described.

FIG. 2 shows one of the expansion units of nominal size broken away and connected to a cylindrical hydraulic thruster assembly 9 with a base 10 adjustably secured coaxial by the threaded end of the piston rod 11a with threads, not shown, adapted for longitudinal reciprocating movement when the thruster assembly 9 is selectively energized.

The expansion unit provides a cylindrical air-water tubular extension 12 which is threaded into the outer end of the base 10 coaxial with the piston rod 11a, as shown. On the outer end member of tubular extension 12 is a coaxial cylindrical tapered entry member 13 which is secured on the extension 12 by a nut 14. A cylindrical sleeve member 15 is positioned in coaxial spaced relation around the extension 12 and retained in the end of base 10 by threads, as shown, which also secures an expandable elastomer tube 16 which is positioned coaxially around the outer surface of the sleeve member 15 and retained by a peripheral undercut in entry member 13 and in the end of the base 10, as shown. A plurality of holes 17 are provided through and around the member 15 and the expandable elastomer tube 16 is positioned around member 15 which is retained thereon by nut 14.

A channel water bore 18 in the base 10 is adapted to enter the central opening in extension 12 and a flexible water line 19 is connected thereto by a coupling 20. A second channel air bore 21 opening into the space between extension 12 and member 15 is connected to a flexible air line 22 by a coupling 23.

FIG. 3 illustrates the relative position of the elements shown in FIG. 2.

FIG. 4 illustrates the die member 2 which is adapted to retain a heated flexible tube 24 into which the forming device 4 has thrust the expansive tube 16 into the bore preceeded by the entry member 13 prior to the expansion cycle of the forming device 4.

Figure 5:
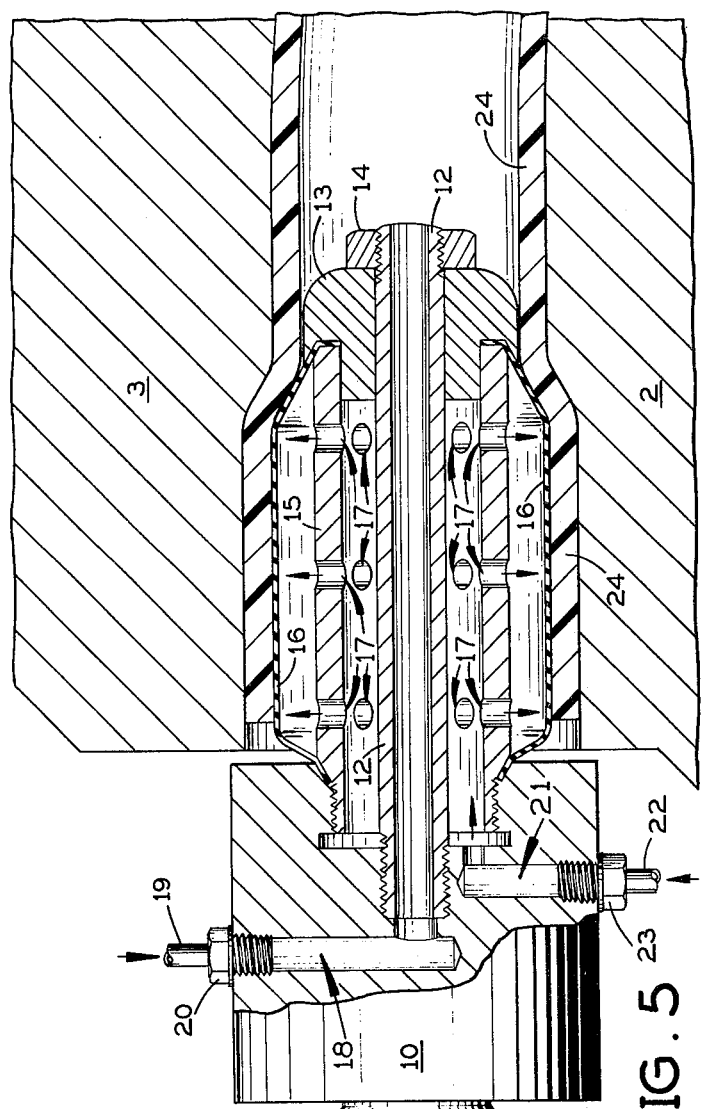
FIG. 5 is an enlarged fragmentary cross sectional view of FIG. 4 with the forming cylinder expanded and the plastic tube formed into a coupling.

FIG. 5 illustrates the operation following the insertion of the expanding means shown in FIG. 4 wherein air pressure is automatically applied through air line 22 which has cylindrically expanded the end portion of the tube 24 against the inner cylindrical enlarged bore in the die members 2 and 3.

Figure 6:
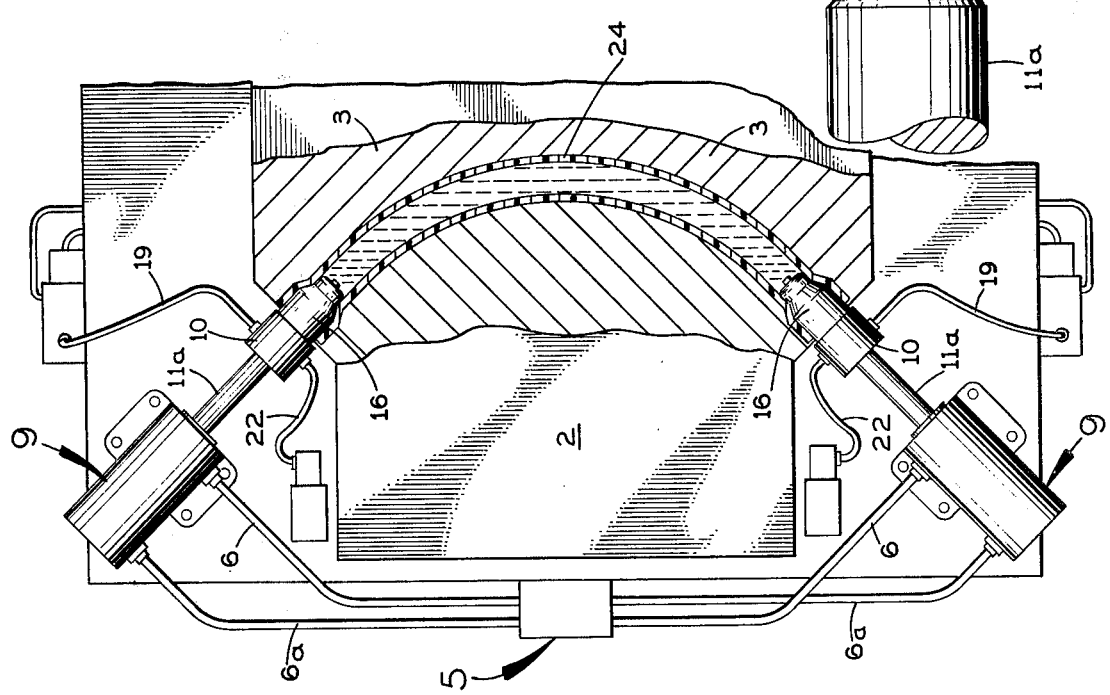
FIG. 6 is a fragmentary view in reduced scale showing the die formed elbow having both ends enlarged by two hydraulically operated forming cylinders.

FIG. 6 illustrates the action of enlarging both ends of a plastic tubular elbow by the simultaneous operation of the hydraulic thrust assemblies 9 and the expansion of tube 16 following insertion into the end portion of the tube 16, as shown in FIG. 4. At this point, the air pressure circuit is opened and cooling water forced into the expansion chamber through water lines 19—19 by the action of conductors 30—30. This action will cause the expanded portions of the elbow to stiffen and retain their enlarged diameter at which time the hydraulic thruster assembly 9 is reversed and the expansion assemblies withdrawn, permitting the opening of the die and the release of the elbow.

Figures 7, 8, 9:
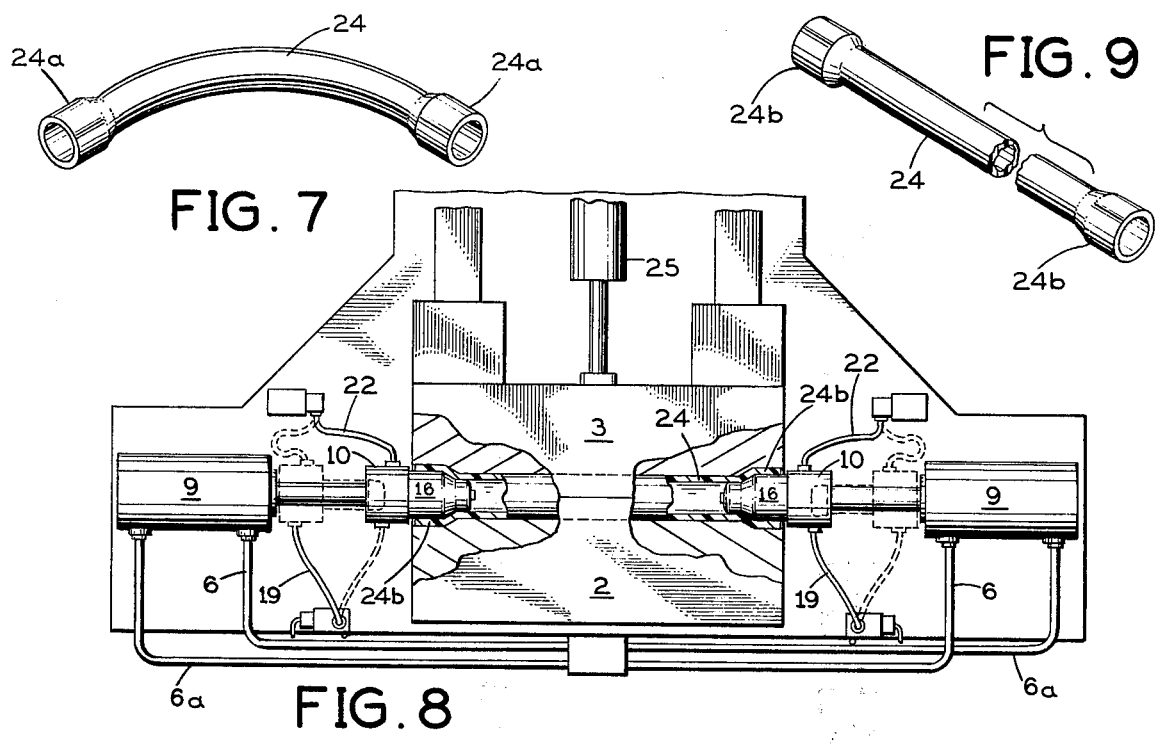
FIG. 7 is a fragmentary view in reduced scale of a pair of hydraulically operated forming cylinders following the insertion in opposite ends of a die-held straight plastic pipe.
FIG. 8 illustrates in reduced scale a coupling enlargement at both ends thereof.
FIG. 9 illustrates a finished plastic tube having both ends enlarged for coupling purposes.

FIG. 7 illustrates the hydraulic cylinder 25 which will open the die member 3 from the die member 2 and permit the tube 24 to descend from the die by gravity. The dotted lines represent the simultaneous reciprocal movement of both expansion assemblies.

FIG. 7 illustrates a perspective view of a finished elbow with coupling enlargements 24a at both ends.

FIG. 8 illustrates the modification in the die members 2 and 3 adapted to enlarge both ends of a straight plastic pipe.

FIG. 9 is a perspective view of a straight length of pipe illustrating a coupling enlargement 24b at both ends.

Figure 10:
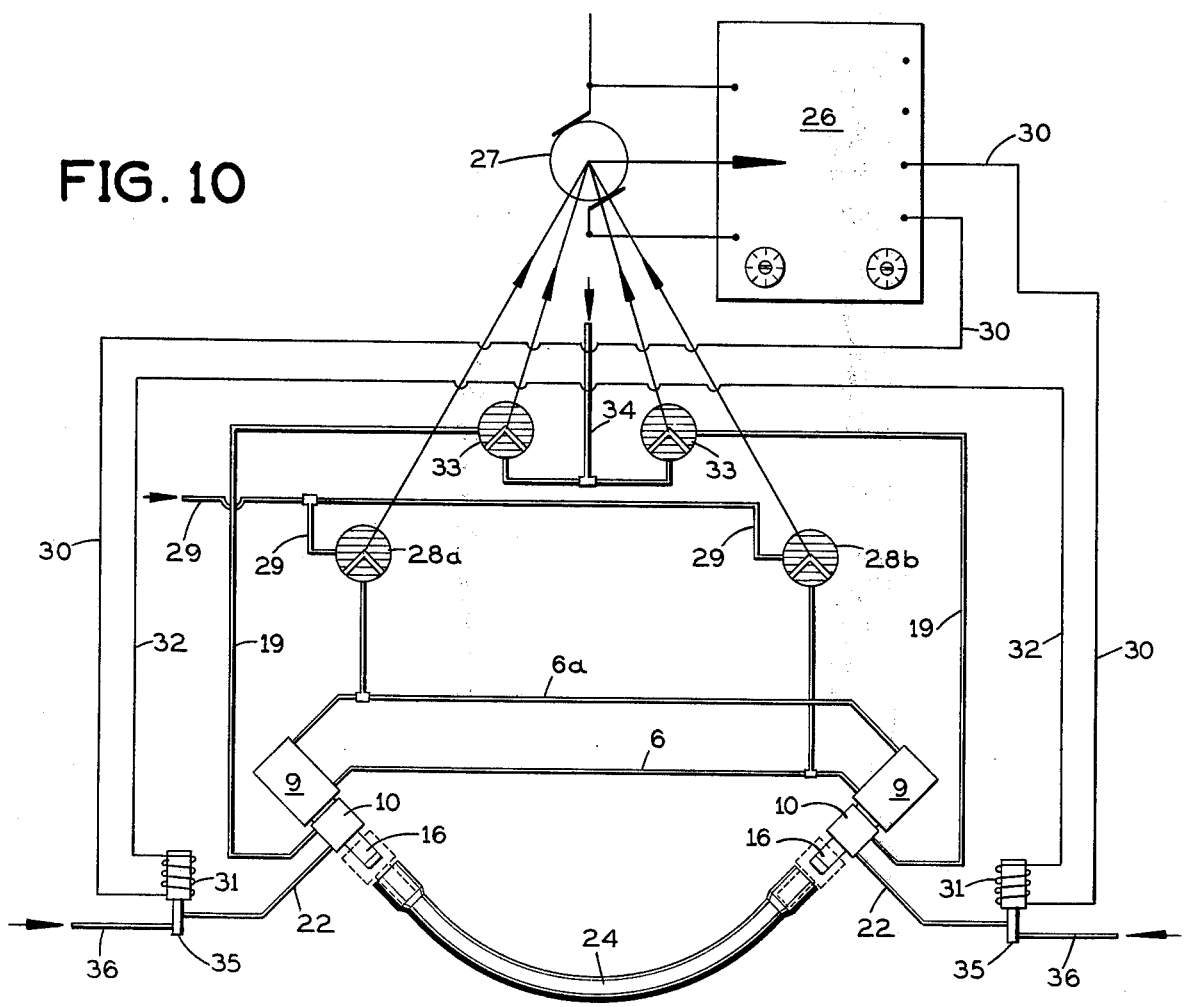
FIG. 10 is a schematic illustration of the hydraulic and air circuitry for forming the enlarged couplings at opposite ends of a plastic elbow pipe.

FIG. 10 shows the electric and motivating control circuits for the operation of the thruster assemblies 9 and the subsequent operation of the member 15 by means of an elastomer tube 16. The electric timing control assembly 26 is operated by a gear motor 27 and operates multiple circuits in predetermined sequence by well known means.

In operation, the first function of the device shown in FIG. 8 is the closure around the die members 2 and 3 by the hydraulic action of cylinder 25 which operation is followed by the opening of valve 28A to a source of pressurized hydraulic fluid carried by pipe line 29, which will energize both thruster assemblies 9—9 through tubing 6A and move cylindrical members 15 and its elastomer tube 16 into the end of the pipe. Conductors 30—30 will energize magnetic valves 31 and permit pressurized air from a source, not shown, to flow through both tubes 32, as indicated by arrows, and permit the elastomer on each member 15 to expand via pressure conducted by lines 22 into the interior of tube 16 and expand same. This action will enlarge the heat softened end portions of the plastic tube 24 to accurately fit the counter bore in each end of the die members 2 and 3. At this point, valve 28a will be closed and both valves 33 will be opened and connect a source of pressurized cooling water conducted by pipe lines 34 which will flow through line 19 into the base 10 of the enlarging unit, which water will cool the elastomer and the enlarged plastic and enlargements 24a at each end of the tube 24 and the outlet of the water will flow from outlet ports 35 in each valve 31 through its cooling period, as indicated by arrows.

As this point the finished tube will be released by the reverse operation of the cylinder which opens the die members 2 and 3 and permits the finished tube 24 to descend.

FIGS. 11 and 12 show an alternate means for expanding the heated tube 24 when secured between the split bore and provided with a coaxial counterbore CB. The base 10a of the thruster assembly has a concentric cylinder 36 which is concentrically threaded on the outer threaded portion 37 of the base 10a. A piston 38 is slidably fitted in the bore of the cylinder 36 and includes an integral projection 39 slidably positioned in a concentric bore. The projection also has a coaxial flange 40 to be hereinafter described and terminates in a threaded end, as shown, on which a tapered plunger 41 is coaxially threaded and having a central bore 42 therethrough. An elastomer tube 43 having a coaxial bore therethrough is fitted on projection 39 between the flange 40 and the plunger 41, as shown, in a collapsed position. The base 10a has a concentric bore 44 therethrough forming a junction with bore 42 in the plunger 41. A transverse bore 45 provides a passage from the threaded water coupling 19a into base 10a. Likewise the air coupling 22a connects with a dual bore 46 which enters the rear of the cylinder 36.

FIG. 12 illustrates the position of the elements when the thruster assembly 9 is activated and the plunger 41 is thrust into the tube 24 followed by the elastomer tube 43 which is now expanded by the movement of the piston 38 and its integral cupped collar 40 which expands the tube 43 thus forcing the expansion of the heated pipe closely in contact with the internal surface of the wall of the counterbore CB. At this time, by the action of the circuit shown in FIG. 10, water enters the bore 44 and through the bore 42 for cooling the heated pipe, thus solidifying the enlarged portion within the counterbore as well as the tube whereby thruster assembly 9 will retract when the air pressure is cut off and the cylinder 36 will withdraw the collapsing elastomer and the plunger 41 from the tube 24 and permit the die members 2 and 3 to open and release the tube 24 for gravity descent. The action of the thruster assembly and the air for the piston and the water for cooling are operated in a predetermined sequence by the control assembly 26.

It is to be noted that the die for forming the elbow in the tube with coupling enlargements at both ends may be readily changed to die means for applying coupling enlargements on both ends of short straight pieces of tubing as well as forming a single coupling enlargement on long or short straight lengths of tubing.

It is to be understood that certain modifications in construction are intended to come within the teachings and scope of the above specification.

Having described my invention, I claim:

1. An apparatus for uniformly expanding the ends of sections of pre-formed and pre-heated plastic pipe which comprises;

cooperating die means for retaining said sections of pre-heated plastic pipe, said die means including an open central portion having a cross-sectional diameter corresponding with the outer diameter of said sections of pre-heated plastic pipe, so that said sections of pre-heated plastic pipe may be securely retained within said cooperating die means;

at least one mandrel adapted for axial reciprocation into the end of said cooperating die means, so that said mandrel, upon the insertion into the end of said cooperating die means, corresponds to only a portion of said section of said plastic pipe retained therein, said mandrel including an outer cylindrical sleeve forming the portion of said mandrel insertable into said cooperating die means, and conforming in configuration to the inner surface of said sections of plastic pipe, and said mandrel further including an expandable elastomeric jacket disposed substantially over the entire surface of said outer cylindrical sleeve, said mandrel having an outside diameter comprising said expandable elastomeric jacket which is less than the inside diameter of said sections of plastic pipe, so that said mandrel may be inserted into said sections of plastic pipe retained within said cooperating die means without deforming said sections of said plastic pipe; and means for expanding said elastomeric jacket after said mandrel has been inserted into the end of said cooperating die means, so that when said sections of plastic pipe are retained within said cooperating die means the portions of said plastic pipe corresponding to said mandrel are uniformly expanded outwardly into conformity with the cross-sectional diameter of said die means, said means for expanding said elastomeric jacket including means for injecting pressurized air within said mandrel, said mandrel including a bore axially disposed therein, and a plurality of apertures through said outer cylindrical sleeve communicating with said axial bore so that when said pressurized air is applied to said bore, said expandable elastomeric jacket disposed over said outer cylindrical sleeve is expanded substantially uniformly outwardly against said sections of preheated plastic pipe.

2. The apparatus of claim 1 including means for injecting pressurized water through said bore disposed within said mandrel, so that when said mandrel is inserted into the end of said die means containing said sections of plastic pipe, said pressurized water may be employed to directly cool the portions of the interior of said sections of plastic pipe which do not correspond to said mandrel.

3. The apparatus of claim 1 wherein said cooperating die means include at least one portion at the end thereof having a cross-sectional diameter which is greater than the outer diameter of said sections of plastic pipe.

4. An apparatus for uniformly expanding the ends of sections of pre-formed and pre-heated plastic pipe which comprises;

cooperating die means for retaining said sections of pre-heated plastic pipe, said die means including an open central portion having a cross-sectional diameter corresponding with the outer diameter of said sections of plastic pipe, so that said sections of plastic pipe may be securely retained within said cooperating die means;

at least one mandrel adapted for axial reciprocation into the end of said cooperating die means, so that said mandrel, upon insertion into the ends of said cooperating die means, corresponds to only a portion of said sections of plastic pipe retained therein, said mandrel including an expandable elastomeric jacket disposed over substantially the entire portion of said mandrel insertable into the end of said cooperating die means so that said expandable elastomeric jacket forms substantially the entire outer surface of said mandrel and conforms in configuration to the inner surface of said sections of plastic pipe, and said surface of said expandable elastomeric jacket forming said outer surface of said mandrel has an outside diameter which is less than the inside diameter of said sections of plastic pipe, so that said mandrel may be inserted into said sections of plastic pipe retained within said cooperating die means without deforming said sections of preheated plastic pipe; and means for expanding said elastomeric jacket after said mandrel has been inserted into the end of said cooperating die means, so that when said sections of plastic pipe are retained within said cooperating die means the portions of said plastic pipe corresponding to said mandrel are uniformly expanded outwardly into conformity with the cross-sectional diameter of said die means, said means for expanding said elastomeric jacket, including a forward end and a rearward end, and including means for urging said rearward end of said elastomeric jacket towards said forward end of said elastomeric jacket in order to expand the central portion of said elastomeric jacket, said means for urging said rearward portion of said elastomeric jacket to said forward portion of said elastomeric jacket including a cylinder co-axially aligned on said mandrel, piston means slidably positioned for axial movement in said cylinder, said piston means including a piston shaft slidably positioned for longitudinal movement along said mandrel, and an annular collar attached to the end of said cylinder piston extended to said cylinder, said collar engaging the second end of said elastomeric jacket, and means for moving said piston within said cylinder so that upon said motion, said collar urges said rearward end of said elastomeric jacket towards said forward end of said elastomeric jacket.

5. The apparatus of claim 4 wherein the ends of the cooperating die means corresponding to said mandrel has a cross-sectional diameter which is greater than the outer diameter of said sections of plastic pipe.

6. The apparatus of claim 4 wherein said mandrel includes a central bore therethrough, and including means for injecting pressurized water through said bore, so that when said mandrel is inserted into the end of said die means containing said section of plastic pipe said pressurized water may be employed to directly cool the interior of said section of plastic pipe which does not correspond to said mandrel.

7. The apparatus of claim 4 wherein said cooperating die means form an arcuate cavity for retaining said sections of pre-heated plastic pipe, and further wherein said mandrels are employed at either end of said cooperating die means.

* * * * *